(No Model.)

H. MILLER.
Machine for Trimming Metal Plates.

No. 237,303. Patented Feb. 1, 1881.

Witnesses:—
Louis M. F. Whitehead.
Fred Haynes

Inventor:—
Herman Miller
by his Attorneys
Brown & Brown

UNITED STATES PATENT OFFICE.

HERMAN MILLER, OF NEW YORK, N. Y.

MACHINE FOR TRIMMING METAL PLATES.

SPECIFICATION forming part of Letters Patent No. 237,303, dated February 1, 1881.

Application filed September 14, 1880. (No model.)

*To all whom it may concern:*

Be it known that I, HERMAN MILLER, of the city and county of New York, in the State of New York, have invented a certain new and useful Improvement in Machines for Trimming Metal Plates, of which the following is a specification.

The tin plates used for making tin boxes and cans are frequently trimmed upon one or both edges by placing them upon an endless chain or apron, by which they are carried between rotary shears or cutters.

The object of my invention is to provide a machine in which the plates (which may be placed or thrown into the machine without any care and by unskilled or cheap labor) will be so guided in their descent by gravity that they will rest properly and squarely upon the endless apron or chain.

To this end the invention consists in the combination, with cutters or shears and an endless carrying apron or chain, upon which plates are to be laid to be carried to said cutters or shears, of a stationary or fixed guide upon one side of said apron or chain, and an elastic or yielding guide upon the other side of the apron or chain, having a downward and inward inclination toward the stationary or fixed guide, whereby a tin plate, which is placed or thrown between the guides during its gravitation downward, is pressed toward and held in contact with the stationary or fixed guide.

Figure 1:
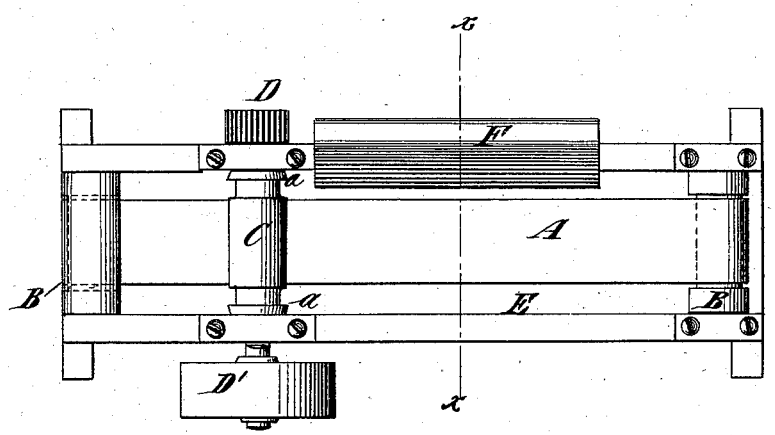
Figure 2:
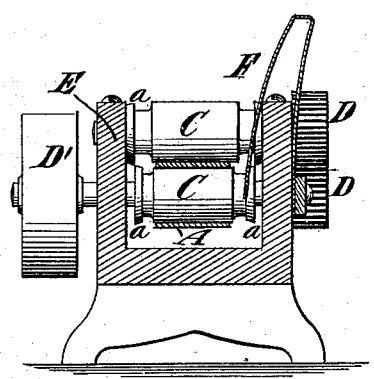

In the accompanying drawings, Figure 1 represents a plan of a machine embodying my invention, and Fig. 2 represents a transverse section thereof upon the dotted line *x x*, Fig. 1.

Similar letters of reference designate corresponding parts in both figures.

A designates a carrier-apron mounted upon rollers B, and having a continuous motion in one direction imparted to it by means of two rollers, C C, between which it passes. These rollers are geared together by wheels D, and upon one is a pulley, D', by which they may be turned. Though the carrier is here shown as consisting of an apron, an endless chain might be substituted therefor;

In the present example of my invention the rotary cutters or shears which are employed to trim one or both edges of the metal plates are formed upon or carried by the rollers C, as will be clearly seen in Fig. 2, the edges or shoulders *a* constituting the cutting-edges; but shears or cutters independent of and separate from the said rollers might be used.

Upon one side or edge of the apron A is a stationary or fixed guide, E, which, in this instance, is formed by one of the side frames of the machine, and upon the opposite side or edge of said apron is an elastic or yielding guide, F, the face of which inclines downwardly and inwardly toward the fixed guide. The guide F may consist of a stiff inflexible plate having a yielding connection with its support, or it may have a rigid connection with its support and possess itself the required elasticity, as in the present example of my invention. The guide F may be very conveniently formed, as in this instance, by bending a thin sheet of tin into the proper form and securing it to one of the side frames of the machine.

When the two guides E and F are employed no care is necessary in placing the tin plates in the machine, as they may be thrown in between the guides by unskilled or cheap laborers, such as boys, for as the plates gravitate downward between the guides the inclined guide will press the plate against the stationary or fixed guide, and, being elastic or yielding, it will be pressed back by the falling plates, thus permitting the plates to rest in a horizontal position upon the carrier apron or chain.

What I claim as my invention, and desire to secure by Letters Patent, is—

The combination, in a machine for trimming metal plates, with cutters or shears and an endless carrying apron or chain, upon which the plates are to be laid to be carried to said cutters or shears, of a stationary or fixed guide upon one side of said apron or chain, and an elastic or yielding guide arranged upon the other side of the apron or chain, and the face of which has a downward and inward inclination toward the stationary or fixed guide, substantially as and for the purpose herein specified.

HERMAN MILLER.

Witnesses:
FREDK. HAYNES,
THOMAS E. BIRCH.